Figure 2:
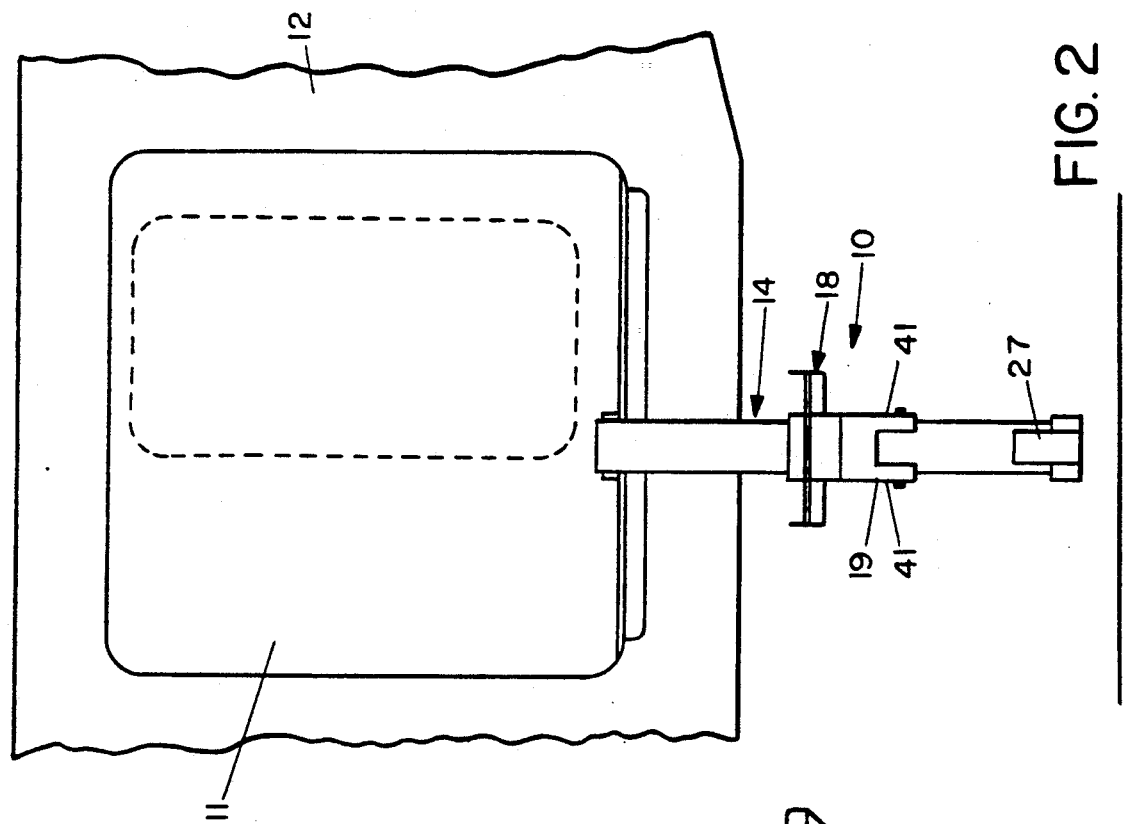

United States Patent [19]

Goon

[11] Patent Number: 5,076,515

[45] Date of Patent: Dec. 31, 1991

[54] STRETCHER LOADING DEVICE FOR AIRCRAFT

[75] Inventor: Peter Goon, Theolevels, Australia

[73] Assignee: Royal Flying Doctor Service of Australia Inc., Norwood, Australia

[21] Appl. No.: 542,896

[22] Filed: Jun. 25, 1990

[51] Int. Cl.[5] ............................ B64C 1/22; B64D 9/00
[52] U.S. Cl. .................................. 244/137.1; 414/471
[58] Field of Search ............... 244/137.1, 137.2, 118.3, 244/118.1, 129.6, 118.5; 182/142, 145, 146, 148, 149, 150; 414/471, 592; 280/166

[56] References Cited

U.S. PATENT DOCUMENTS

| 2,122,908 | 7/1938 | Collins | 182/142 |
|---|---|---|---|
| 2,356,155 | 8/1944 | Fogle | 244/137.1 |
| 3,885,685 | 5/1975 | Montgomery et al. | 244/137.1 |
| 3,944,087 | 3/1976 | Mölter et al. | 244/137.1 |
| 3,961,809 | 6/1976 | Clugston | 280/166 |
| 4,573,854 | 3/1986 | McFarland | 414/471 |
| 4,725,183 | 2/1988 | Smillie, III. | 224/42.44 |
| 4,875,547 | 10/1989 | Hanthorn | 182/145 |

Primary Examiner—Joseph F. Peters, Jr.
Assistant Examiner—Virna Lissi Mojica
Attorney, Agent, or Firm—Brown, Martin, Haller & McClain

[57] ABSTRACT

A load handling device for transferring a load such as a stretchered patient to and from an aircraft, comprising an elongate pedestal pivotally connected at one end thereof for swinging movement about a horizontal axis located within the opening of an aircraft cabin door, a cantilevered horizontal platform securable to the pedestal and arranged to be driven by drive means for vertical up and down movement along the pedestal between an upper position where it is approximately level with the aircraft floor and the lower position where it is adjacent to the ground, wherein the pedestal is arranged to swing between a retracted stowed position wherein it is contained wholly within the aircraft cabin and an extended operating position wherein it projects approximately vertically downwards adjacent the aircraft cabin door.

10 Claims, 5 Drawing Sheets

STRETCHER LOADING DEVICE FOR AIRCRAFT

This invention relates to a raisable and lowerable load handling device for use in aircraft, and in particular to an improved aircraft stretcher loading device designed for use in air ambulances for transporting by air a patient to a hospital, from a remote location. The device is also suitable for handling general cargo being loaded onto or from the aircraft.

At the present time, aircraft are used quite widely in transporting of patients in need of hospitalisation from remote areas, and the usual procedure is that the stretcher patient is taken by a road ambulance to a nearby airport or airfield, transferred into an aircraft where he is either asked to walk into the aircraft, or is carried to the aircraft, then transferred to a stretcher secured in the aircraft, the aircraft then transports him to a waiting ambulance at an airport at the locality of an hospital, the patient once again being transferred to the ambulance stretcher from the aircraft and transported by road to the hospital.

A serious danger has been found to exist where the stretchered patients are loaded into and out of the aircraft which, as stated above, has essentially been a manual task, and deaths have occurred due to minor accidents during such loading and unloading of the stretchered patients.

Whilst it is also known to load and unload stretchered patients from air ambulances using airfield based lifting equipment, it will of course be appreciated that such ground support equipment is not available at many of the remote locations where air ambulances operate.

It is the main object of the present invention to provide an improved load handling device for aircraft, especially an air ambulance, which will greatly facilitate the loading and unloading of a load, e.g. a stretchered patient, into and out of an aircraft.

It is a further object of the present invention to provide an improved load handling device which is of light-weight construction and is easy to deploy and stow.

It is a still further object of the present invention to provide an improved load handling device which can be used without the need for any airfield ground support equipment and which relies upon the power system of the aircraft for its operation.

According to this invention therefore, an improved load handling device for transferring a load, e.g. a stretchered patient, to and from an aircraft comprises pedestal mounting means arranged to be secured within the aircraft in the vicinity of an aircraft cabin door, an elongate pedestal, hinge means pivotally connecting said pedestal at its inner end to said mounting means for swinging movement about an horizontal axis, a cantilevered horizontal platform means detachably secured to said pedestal and arranged for vertical up and down movement along the pedestal between an upper position where it is approximately level with the level of the aircraft floor and a lower position where it is adjacent the ground, and drive means for effecting vertical up and down movement of said platform means along the pedestal, said pedestal being constructed and arranged for swinging movement between a retracted stowed position wherein it is contained wholly within the aircraft cabin and an extended operating position wherein the pedestal projects approximately vertically downwards from the cabin door adjacent the outer side thereof.

Preferably, the drive means includes a linear drive screw, preferably of the recirculating ball type, a threaded nut threadably engaging said drive screw for movement therealong, an electric motor carried on the pedestal and drivingly coupled to said screw for rotating same, and a carriage member carried by the nut, said platform means releasably engaging said carriage arranged so that, with said platform means thus engaged, loads applied to the platform are transferred, via the pedestal, to the supporting aircraft structure. The electric power to the motor is derived from an electrical power source in the aircraft.

Preferably, the electric motor is carried on the pedestal at its distal end.

Preferably, the drive system also comprises a gearbox/brake unit which enables the platform to be braked at any position during its vertical up and down movement along the pedestal.

In another preferred embodiment, the cantilevered pedestal is formed of high strength aluminium and is provided with wear resistant longitudinally extending bearing tracks for guiding the screw-engaging carriage up and down the pedestal.

In yet a further preferred embodiment, the pedestal has associated therewith a damper member, e.g. a variable rate hydraulic shock absorber, which serves as a rate damper during deployment of the pedestal from the stowed position to its lowered operating position, such that the pedestal swings downwardly with progressively increasing deceleration.

In its application as a stretcher loading device, the invention allows a patient to be very easily and safely transferred whilst still on a stretcher, from the ground into an aircraft, and be similarly transferred from the aircraft back to the ground when the aircraft has landed, without the need of any airfield ground support equipment, and requiring only one or two attendants, preferably one in the aircraft, another on the ground.

Preferably, the platform means includes a foldaway step movable between an out-of-use position wherein it lies substantially flush with the upper surface of the platform, and an elevated in-use position wherein it is horizontally positioned between the platform and the inner (upper) end of the pedestal. Thus, with the platform in its lowest position on the pedestal, the device can be used as an auxiliary means of access into the aircraft when the main cargo door is open, simply by elevating the foldaway step. In addition, the flat deck of the platform (with the step folded away) enables ambulatory patients to be lifted into and out of the aircraft while standing on the platform.

Figure 1:
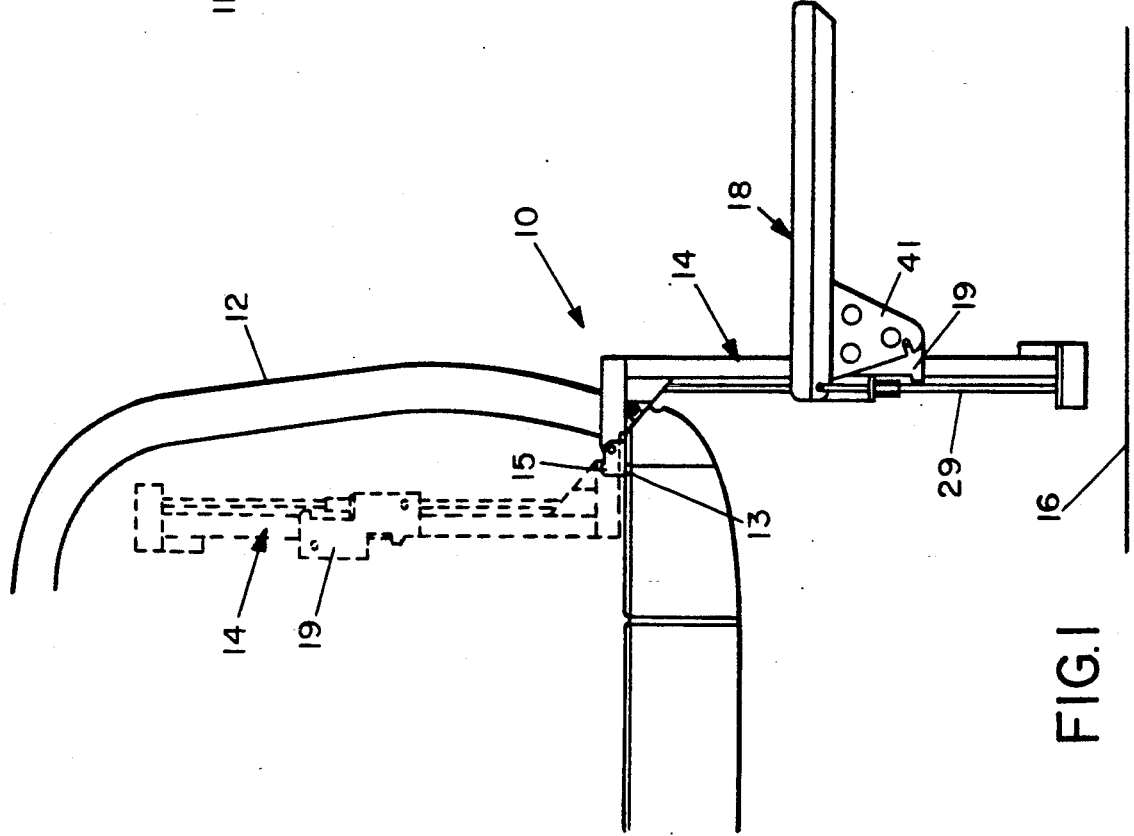
Figure 4:
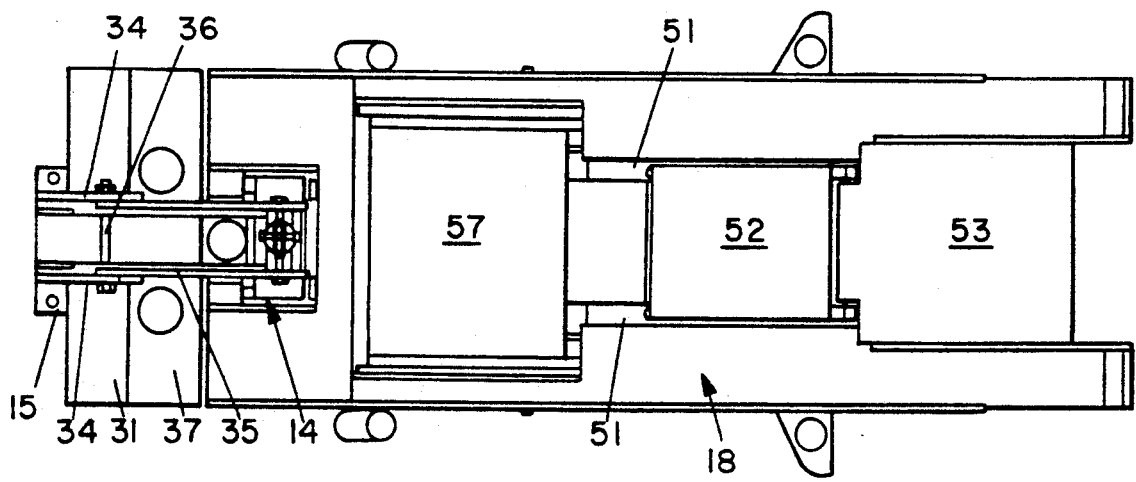
Figure 3:
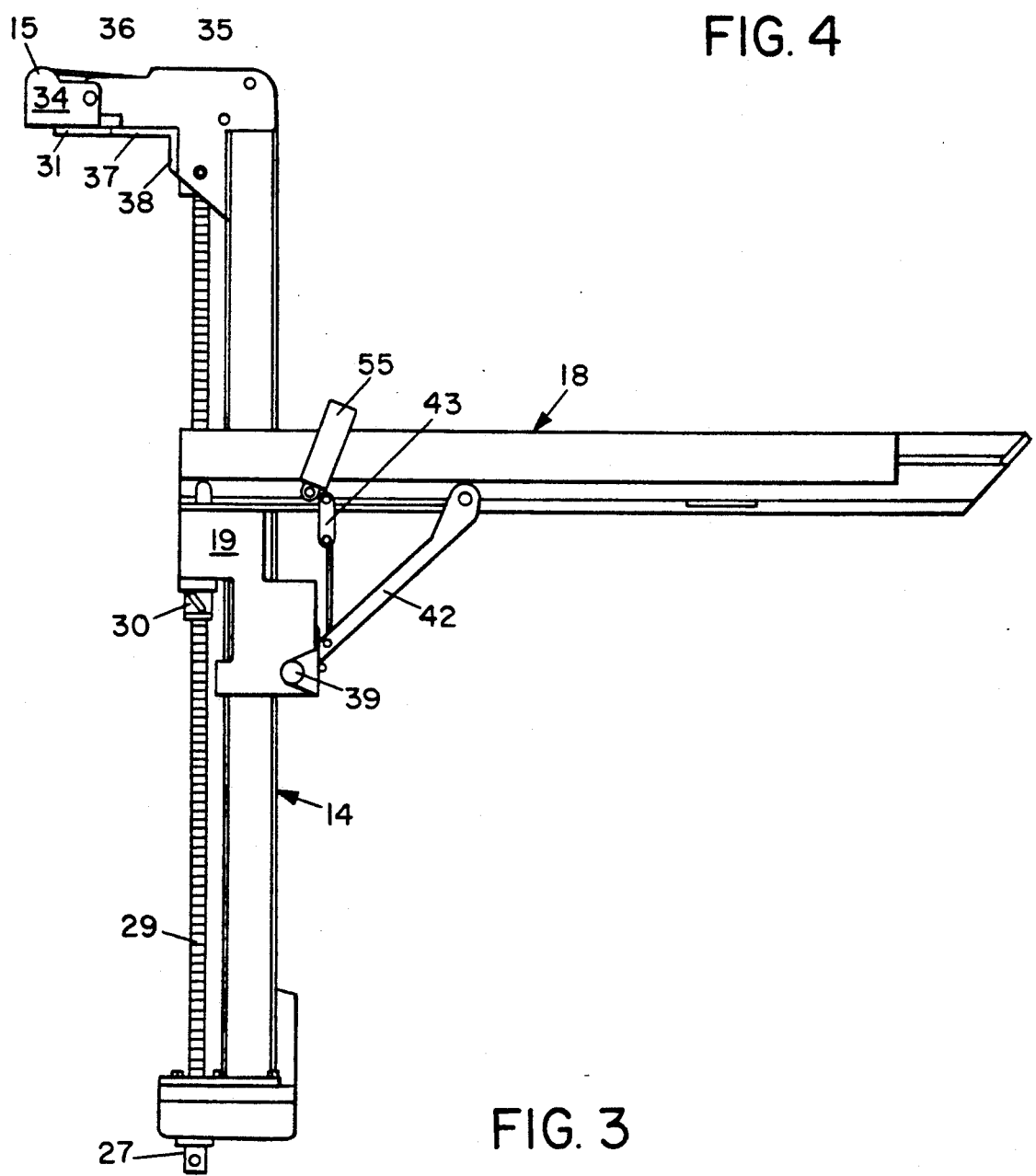
Figure 5:
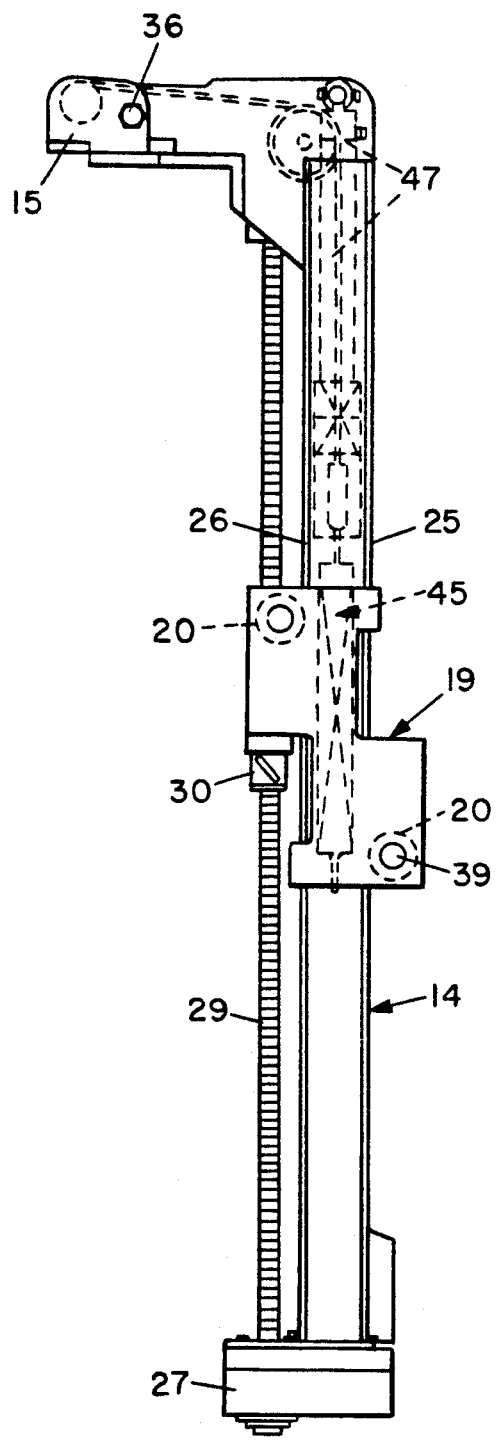
Figure 6:
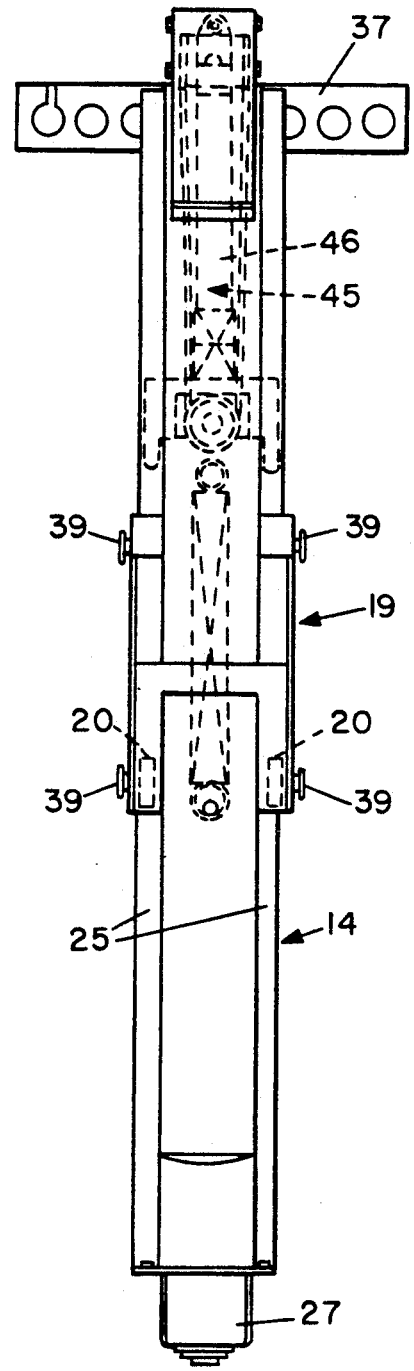
Figure 7:
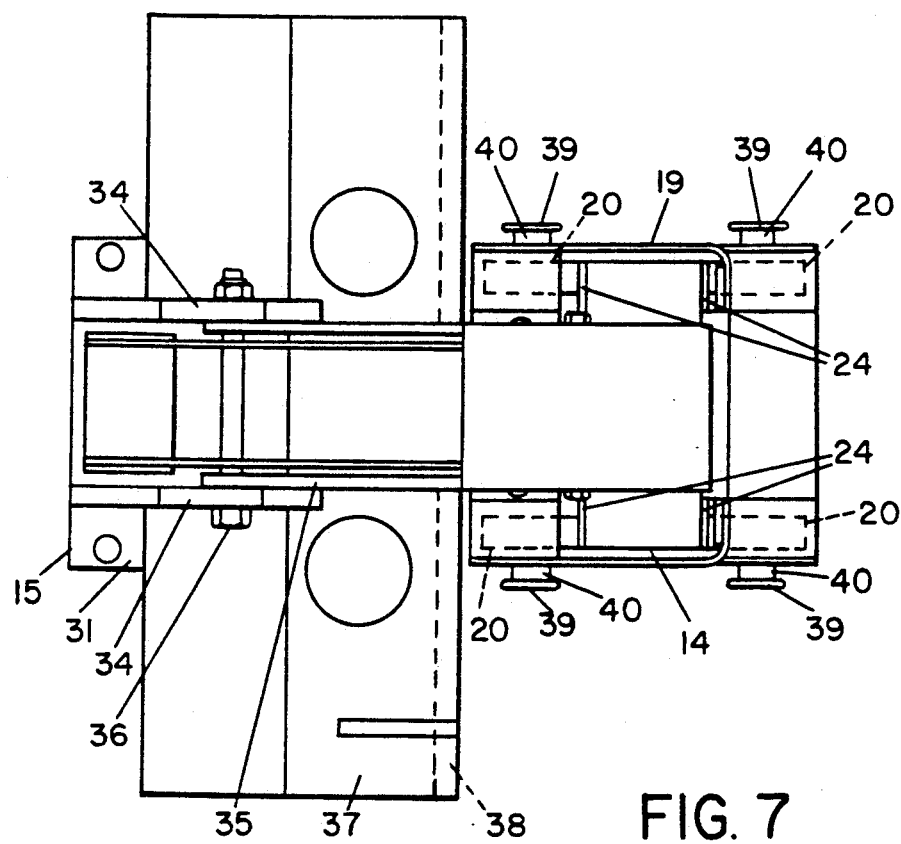
Figure 8:
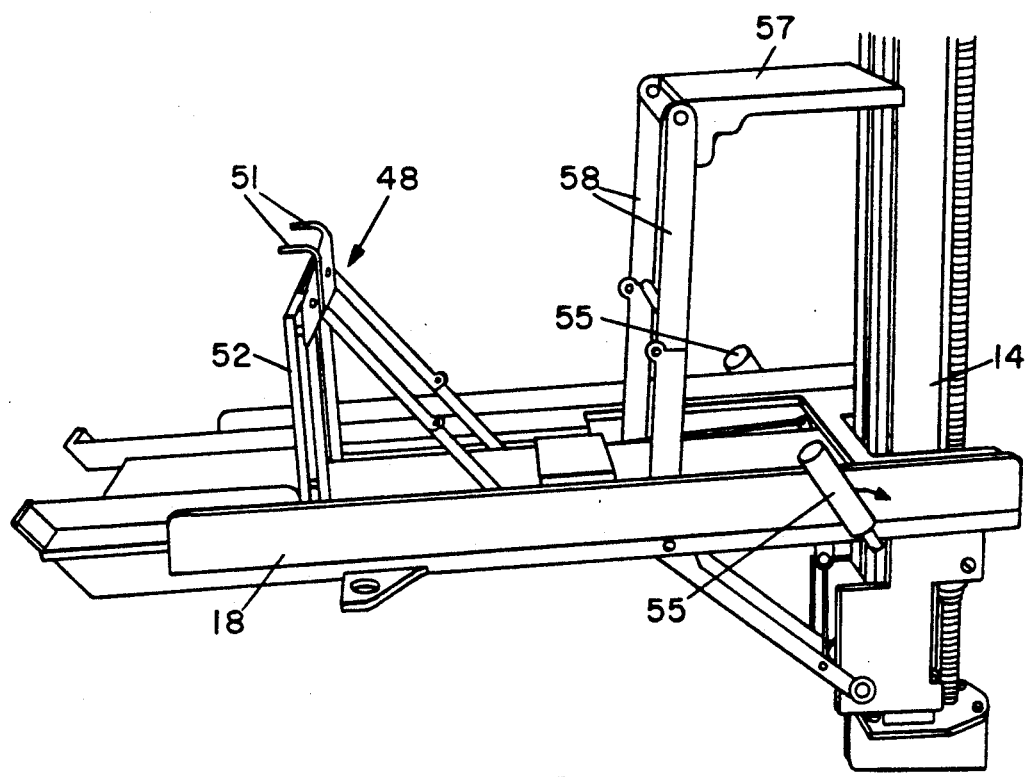
Figure 9:
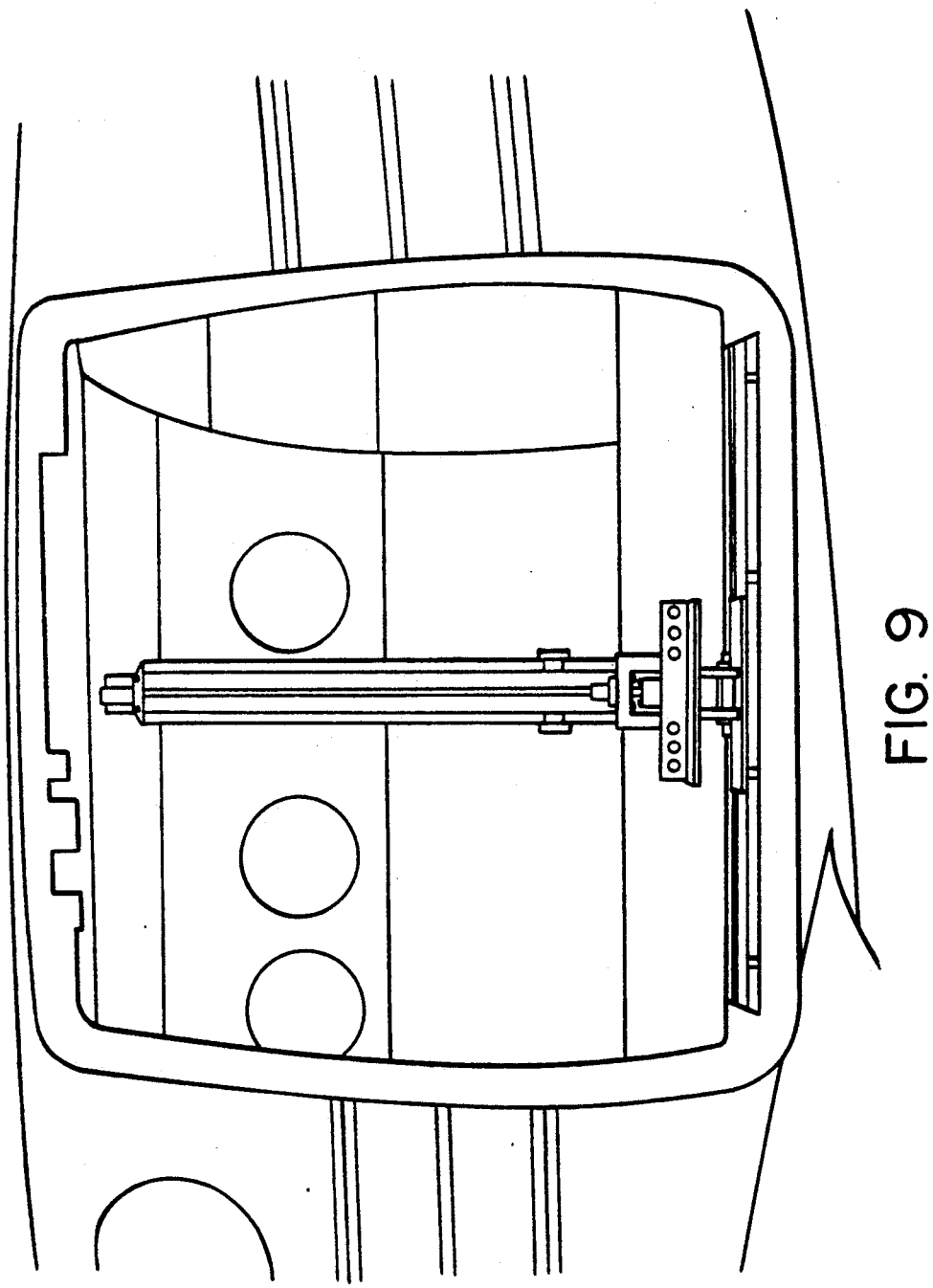

In order to more fully explain the invention, an embodiment is described hereunder in some further detail with reference to and as illustrated in the accompanying drawings in which:

FIG. 1 is a side elevational view (partly schematic) of the load handling device of this invention fitted to an aircraft, FIG. 2 is a front elevational view of the device shown in FIG. 1, FIG. 3 is a side elevational view showing the device in more detail, FIG. 4 is a plan view of the device shown in FIG. 3, FIG. 5 is a side elevational view of the pedestal (with the platform detached) and its mounting which is designed for attachment to the seat tracks within the aircraft, FIG. 6 is a front elevational view of the assembly shown in FIG. 5, FIG. 7 is a plan view on Arrow A of FIG. 5, FIG. 8 is a fragmentary perspective view of the device with the platform in its lowermost position on the pedestal, and FIG. 9 is a front view of the device (with the platform detached) in its stowed position in the aircraft.

Referring to FIGS. 1 and 2, the stretcher loading device 10 is shown projecting through the cargo door opening 11 formed in the side wall of an aircraft 12, the aircraft being provided with two pairs of "Douglas tracks" 13, namely tracks which extend for part of the length of the aircraft, one on the port side and the other on the starboard side—this being in accordance with normal aircraft construction.

The stretcher loading device 10 comprises a swinging pedestal 14 which is pivotally attached at its inner end to a mounting 15 secured to the track 13 and positioned adjacent the sill of the cargo door opening 11, the hinge arrangement being designed to permit the pedestal 14 to be swung about an horizontal axis between a stowed position wherein it is housed within the aircraft adjacent the cargo door opening 11 and an extended operating position where it depends vertically downwards from the cargo door opening 11. The pedestal 14 in this embodiment is formed from rectangular-section hollow tube of high strength aluminium and has a length such that when it is in its lowered operating position, the lower or distal end of the pedestal 14 is located a short distance above the level of the ground 16 to allow for rough field operations.

The pedestal 14 has releasably attached thereto a cantilevered horizontal lifting platform 18 which is arranged for vertical up and down movement along the pedestal 14. In its uppermost position, the platform 18 is approximately aligned with the level of the aircraft floor and thus permits for example a stretcher (not shown) to be wheeled conveniently from the platform 18 into the interior of the aircraft 12 (or vice versa), whilst when in its lowermost position, a stretcher (not shown) can be conveniently wheeled thereonto ready to be elevated to the uppermost position.

The lifting platform 18 is carried on the pedestal 14 by means of a movable screw truck or carriage 19 which is provided with two pairs of transversely aligned roller bearings 20 which rollingly engage wear strips 24 (refer FIG. 7) attached to the front and rear faces of the flanges 25, 26 respectively of the pedestal 14, the truck or carriage 19 being driven by an electric drive motor 27 via a linear drive threaded member 29. The truck or carriage 19 is driven along the linear drive threaded member 29 by means of a screw nut 30 of the recirculating type. The drive to the power thread 29 is through a gearbox, brake and clutch system which, in this embodiment is designed for a maximum all-up mass lift time of approximately thirty seconds, with a fail safe brake feature. The thread 29 is approximately co-extensive with the pedestal 14 and supported adjacent to its rear wall.

In this embodiment, the carriage 19 is provided with four carriage attachment points in the form of lugs 39 mounted on respective pins 40 which also rotatably support the roller bearings 20, on the sides of the pedestal 14. As shown in FIGS. 1 and 2, the platform is removably attached to the carriage by means of slotted support plates 41 which are simply slide over the attachment lugs 39 on the sides of the pedestal 14. As shown in FIGS. 3 and 8, the attachment to the carriage 19 is by means of a hinged stay 42 which detachably connects at its lower end to the lower lug 37, and a hinged link member 43 which is hinged at its upper end to the underside of the platform 18 and at its other end to a point near the lower end of the stay 42. The arrangement of the stay 42 and member 43 is such that when the platform is not in use, these can be folded inwardly to lie substantially flat against the underside of the platform 18. The attachment of the platform to the carriage is such that loads applied to the platform are transferred, via the pedestal, into the supporting aircraft structure.

The electric drive motor 30, which is carried at the distal end of the pedestal 14, is powered from the aircraft medical electrical system (not shown) which obviates the need for any airfield ground support equipment for the operation of the loading device. This is an important consideration when transporting patients from remote locations where facilities are severely handicapped.

The mounting 15 comprises a fixed mounting plate 31 secured to the seat tracks 13, and a pair of spaced upstanding opposed flanges 34 between which is pivotally mounted an inwardly extending portion 35 of the pedestal 14 by means of horizontal pivot bolt 36. The pedestal portion 35 has fixed thereto a transverse angle section member 37 which, when the pedestal is in its in-use position, has its vertical leg 38 abutting edge-wise against the sill of the cargo door opening 11. The member 37 not only stiffens the inner end of the pedestal but also assists in spreading loads applied to the pedestal to the aircraft support structure.

From the foregoing description and the accompanying drawings the operation of the loading device is self-evident. When the loading device is required to be used, the pedestal 14 is swung from its stowed position (refer FIG. 9), about its hinge bolt 36, out through the door opening 11 under its own weight, preferably controlled by a built-in damper system 45 until the pedestal 14 hangs vertically from the door opening 11. The platform 18 is then attached to the carriage 19 on the pedestal 14 and the platform 18 is subsequently lowered to its lowermost position ready to receive a load, for example a stretchered patient.

The pedestal damper system 45 preferably comprises a variable rate hydraulic shock absorber 46 which is inbuilt into the pedestal 14 and is actuated through a cable and pulley system 47.

In the case where a stretcher is to be lifted, this is performed by positioning the stretcher so that its main wheels straddle the platform 18 and its bogie wheel engages on the platform 18. The stretcher is then restrained to the platform by a latching system 48 (refer FIG. 8), and the platform is subsequently raised by operating the electric drive motor 17. Once the load is off the stretcher main wheels, they are then folded and locked in their up position. After the platform 18 with the stretcher on board has been raised to the upper position which coincides with the level of the aircraft floor, an attendant on the ground supports the outboard end of the stretcher while the attendant in the aircraft releases the latching system 48 and the stretcher is then wheeled into the aircraft, the procedure being reversed when unloading the stretchered patient from the aircraft.

The stretcher is of a standard type and known in the trade as a "Ferno Washington" which is in common use in ambulances throughout the country.

The "snap-action" latching system 48 is inbuilt into the platform 18 and comprises a pair of transversely aligned curved latch fingers 51 carried on a swinging panel 52 which is movable between a retracted position wherein it lies flat against the upper surface of the deck 53 of the platform 18, with the fingers 51 housed in recessed portions in the deck 53, and an elevated position where the panel 52 is upright to allow the fingers 51 to lockingly engage with a cross-bar on the underside of the stretcher. The panel 52 is actuated by means of a pair of over-centre hinged strut units 54, each of which when collapsed has its strut portions lying one on top of the other, and actuating handles 55, one on each side of the platform adjacent its inner end, which are coupled to the struts 54 by means of link rods (not shown). The latching system can be operated by an attendant on the tarmac, or, when the platform is level with the aircraft door, by the attendant in the aircraft. With the stretcher locked to the platform, the raising and lowering operations do not require any physical support from attendants.

As also shown in FIG. 8 the stretcher loading device 10, when lowered, can serve as a "three step" stairway to provide an auxiliary means of access in and out of the aircraft through the cargo door opening 11 for attendants and ambulance patients. This is achieved by means of a folding step 57 inbuilt into the platform 18, the step 57 being movable between a retracted position where it lies flat against the deck 53 of the platform 18 and an elevated position where it lies horizontally intermediate the platform deck and the upper end of the pedestal 14. The step 57 when elevated, is supported by a pair of hinged arm supports 58 at its leading end and by an abutment secured to the front of the pedestal 14 at its inner end. The hinge supports 58 assume an "over-centre" position when extended.

A brief consideration of the abovedescribed embodiment will indicate that the invention provides for a simple yet effective load handling device which is easy to deploy and stow away in the aircraft and which is able to be operated with a maximum of two persons in attendance. Specifically, the invention enables a stretchered patient to be loaded and unloaded from an aircraft with a great deal of safety without the need for any heavy difficult lifting by the attendants.

I claim:

1. An improved aircraft stretcher loading device for transferring a stretchered patient to and from an aircraft comprising:

pedestal mounting means securable within the aircraft in the vicinity of an aircraft cabin door;

an elongate pedestal;

hinge means pivotally connecting said pedestal at its inner end to said mounting means for swinging movement about an horizontal axis between a retracted stowed position wherein said pedestal is contained wholly within the aircraft cabin and an extended operating position wherein said pedestal projects approximately vertically downwards from said cabin door adjacent to the outer side thereof;

a cantilevered horizontal platform means guided for vertical up and down movement along said pedestal between an upper position where said platform means is approximately level with the level of the aircraft floor and a lower position where said platform means is adjacent to the ground;

drive means for effecting said vertical up and down movement of said platform means said pedestal; and a stretcher retention means carried on said platform for locking the stretcher against movement when positioned on said platform.

2. An improved loading device according to claim 1 wherein said platform means is removably connected to said pedestal.

3. An improved loading device according to claim 1 wherein said drive means comprises a linear drive screw, a threaded nut threadably engaging said drive screw for movement therealong, an electric motor drivingly coupled to said screw for effecting rotation thereof, and a driven carriage carried by said nut, said platform means being detachably supported by said carriage.

4. An improved loading device according to claim 3 wherein said electric motor is carried on said pedestal at its distal end.

5. An improved loading device according to claim 1 wherein said carriage is provided with a plurality of roller bearings which rollingly engage longitudinally extending bearing tracks on the front and rear faces of said pedestal, for guiding said carriage therealong.

6. An improved loading device according to claim 1 wherein the attachment between said platform means and said carriage is such that loads applied to said platform are transformed via said carriage to said pedestal and therefrom to the supporting aircraft structure.

7. An improved loading device according to claim 1 wherein said pedestal has associated therewith a damper unit for damping said movement of the pedestal as it is swung from said stowed position to said lowered operating position.

8. An improved loading device according to claim 1 wherein said cantilevered platform includes a folding step movable between an out-of-use position wherein it lies substantially flush with the upper surface of said platform, and an elevated in-use position wherein it lies horizontally intermediate said platform and the upper end of said pedestal, whereby when said platform is in its lowered position, and said step is in its elevated position, the loading device serves as a stairway for entering or exiting through the cabin door opening of the aircraft.

9. An improved loading device according to claim 1 wherein said stretcher retention means comprises pivotal stretcher retention means carried on said platform and movable between a retracted approximately horizontal out-of-use position and an extended in-use position wherein said pivotal stretcher retention means projects upwardly from said platform, said pivotal stretcher retention means comprising a latching device which, when said pivotal stretcher retention means is in said extended position, is arranged to lockingly engage with latch engaging means on the underside of a stretcher for locking said stretcher against movement when positioned on said platform.

10. An improved loading device according to claim 9 wherein movement of said pivotal stretcher retention means is effected by manually operable pivotal crank handle means located near the inner end of said platform, said handle means being operable by an attendant on the ground, or when said platform is raised to its elevated upper position, by an attendant in the aircraft.

* * * * *

UNITED STATES PATENT AND TRADEMARK OFFICE
CERTIFICATE OF CORRECTION

PATENT NO. : 5,076,515
DATED : December 31, 1991
INVENTOR(S) : PETER GOON It is certified that error appears in the above-identified patent and that said Letters Patent is hereby corrected as shown below:

Column 6, Line 34 "damping said movement of the pedestal" should read --damping the movement of said pedestal--

Signed and Sealed this

Seventeenth Day of August, 1993

*Attest:*

BRUCE LEHMAN

*Attesting Officer*  *Commissioner of Patents and Trademarks*